United States Patent [19]
Bell

[11] 3,749,936
[45] July 31, 1973

[54] FAULT PROTECTED OUTPUT BUFFER

[75] Inventor: Antony Geoffrey Bell, Houston, Tex.
[73] Assignee: Texas Instruments Incorporated, Dallas, Tex.

[22] Filed: Aug. 19, 1971
[21] Appl. No.: 173,200

[52] U.S. Cl. ................. 307/202, 307/205, 307/279, 307/251
[51] Int. Cl. ............................................ H02h 7/20
[58] Field of Search .................... 307/202, 251, 205, 307/208, 279

[56] References Cited
UNITED STATES PATENTS

| | | | |
|---|---|---|---|
| 3,395,290 | 7/1968 | Farina et al. | 307/202 |
| 3,026,469 | 3/1962 | Wilbur et al. | 307/202 X |
| 3,407,339 | 10/1968 | Booher | 307/202 |
| 3,546,610 | 12/1970 | Checinski | 307/202 X |
| 3,555,374 | 1/1971 | Usuda | 307/202 X |
| 3,599,018 | 8/1971 | Washizuka | 307/251 |

*Primary Examiner*—John S. Heyman
*Attorney*—Harold Levine, Gary C. Honeycutt and Richard L. Donaldson et al.

[57] ABSTRACT

Disclosed is a dynamic output buffer having a fault protected output. The circuit is integrated on a monolithic chip, and the output is protected for a specific duty cycle against short circuits to both substrate ground and to a high voltage.

26 Claims, 3 Drawing Figures

PATENTED JUL 31 1973 3,749,936

Figure 1:
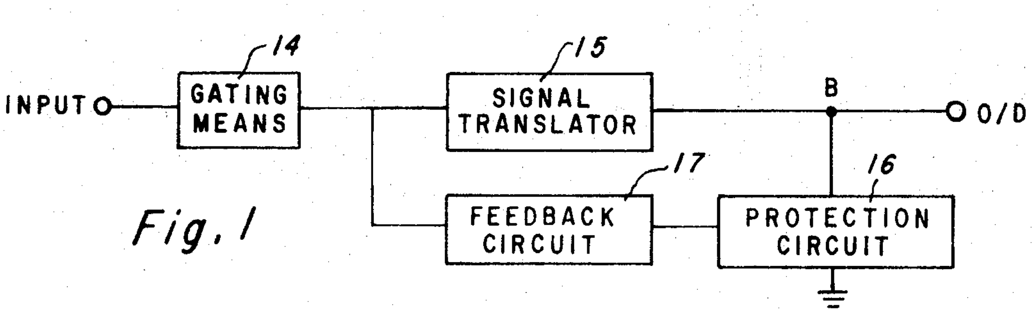

INVENTOR
Antony Geoffrey Bell

BY Richard L Donaldson

ATTORNEY

FAULT PROTECTED OUTPUT BUFFER

This invention relates to dynamic output buffer circuits in general and more specifically to an insulated gate field effect transistor dynamic output buffer circuit which has a fault protected output.

Semiconductor devices have finite breakdown voltage and current limitations according to equations of physics well known to those in the art. A semiconductor devcie device withstand short periods of high current or longer periods of lower current. However, if these devices are overstressed by exceeding these limitations, then the device may become permanently inoperative.

Conventional circuits utilize designs having a relatively large junction area and design parameters such that the semiconductor junction can withstand short periods of high current without becoming permanently inoperative, hereafter, referred to as "burning out". Other circuits utilize a duty cycle technique that allows the semiconductor to be conducting only for so great a duty cycle that the semiconductor can withstand the relatively high current without burning out.

It is an object of this invention to produce an output buffer circuit which has its output protected against long periods of high current due to its output becoming short circuited either to a low or to a high voltage. It is a further object of the present invention to provide a fault protected output buffer integrated on a single monolithic chip.

Briefly, and in accordance with the present invention, a feedback circuit is added to an output buffer. The output buffer comprises an input gating means for receiving an input signal and selectively transferring it to an inverting or non-inverting signal translator, i.e., to an electrical circuit which produces at its output the true or complement logic state of the signal at its input. The output of the signal translator is the output of the buffer circuit. The feedback loop comprises a protection means for assuring that voltage spikes and current spikes do not damage the semiconductor junctions of the output transistors or of the transistors in the connecting feedback loop. Connected to the protection means is a feedback circuit which recirculates either a true or complement logic form of the output signal, depending upon whether the signal translator is a non-inverting or an inverting type translator, respectively. This feedback circuit selectively couples this true or complement signal to the input of the signal translator. This selective coupling is such that only during the interval that the input signal is not coupled to the input of the signal translator is the true or complement logic form fed back. This selection process may be accomplished by a clock signal and an inverted clock signal, or it may be accomplished by utilizing various states of an enabling circuit as gate signals.

If the signal translator is a non-inverting type, then the selected input will appear on the output in its true logic state until a new selected data input forces the output into a different state. If this same logic state on the output is fed-back to the input, then, as the signal translator is non-inverting, no change on the output will appear as a result of the transfer of the feedback signal. There will be no signal interference if this feedback signal is allowed to propagate through the signal translator circuit only when the selective input singal is not allowed to propagate, as is accomplished as stated earlier with a gating means.

However, if the output becomes shorted to a high voltage when a low signal has been previously applied to the input, which had driven the output to a low state, then a high amount of current will flow through the output transistor junction of the device. This high output signal corresponds to a logic 1 and by propagating it through the signal translator, it forces the low level output logic state into a high level output logic, i.e., turns off the previously conducting transistor and thus minimizes the power dissipation through the output of the device. Only when the input is allowed to propagate through and reset the signal translator to the "on" state, will high dissipation again be encountered. This happens only for a designed small part of the duty cycle, causing the total power per cycle dissipated to be less than the maximum as established by the current carrying limitation of the device. Conversely, if the output is shorted low when a low is on the input then the power dissipation through the output transistor junction of the device is already minimized, and the device can withstand relatively long periods in this condition.

Conversely, if a high is on the input when the output shorts to a low voltage, a logic zero is selectively fed back which resets the signal translator to an "on" state, thereby de-coupling the "low" output terminal from the high voltage source by turning off the upper transistor of the output pair. Again, power dissipation is thus minimized. When a low is on the input and the output shorts low, only a "low" is fed back and once again the state of the signal translator is proper for the state of minimum power dissipation.

Applying the same principle to an output buffer circuit having a logic inverter as a signal translator, then the feedback circuit will comprise a logic inverter. The same principles apply of feeding back the proper logic form of the output to drive the signal translator into the least power dissipating state.

The novel features believed to be characteristic of this invention are set forth in the appended claims. The invention itself, however, as well as other objects and advantages thereof may best be understood by reference to the following detailed description when read in conjunction with the accompanying drawings.

FIG. 1 is a block diagram of the functional components of the output buffer.

Figures 2A, 2B:
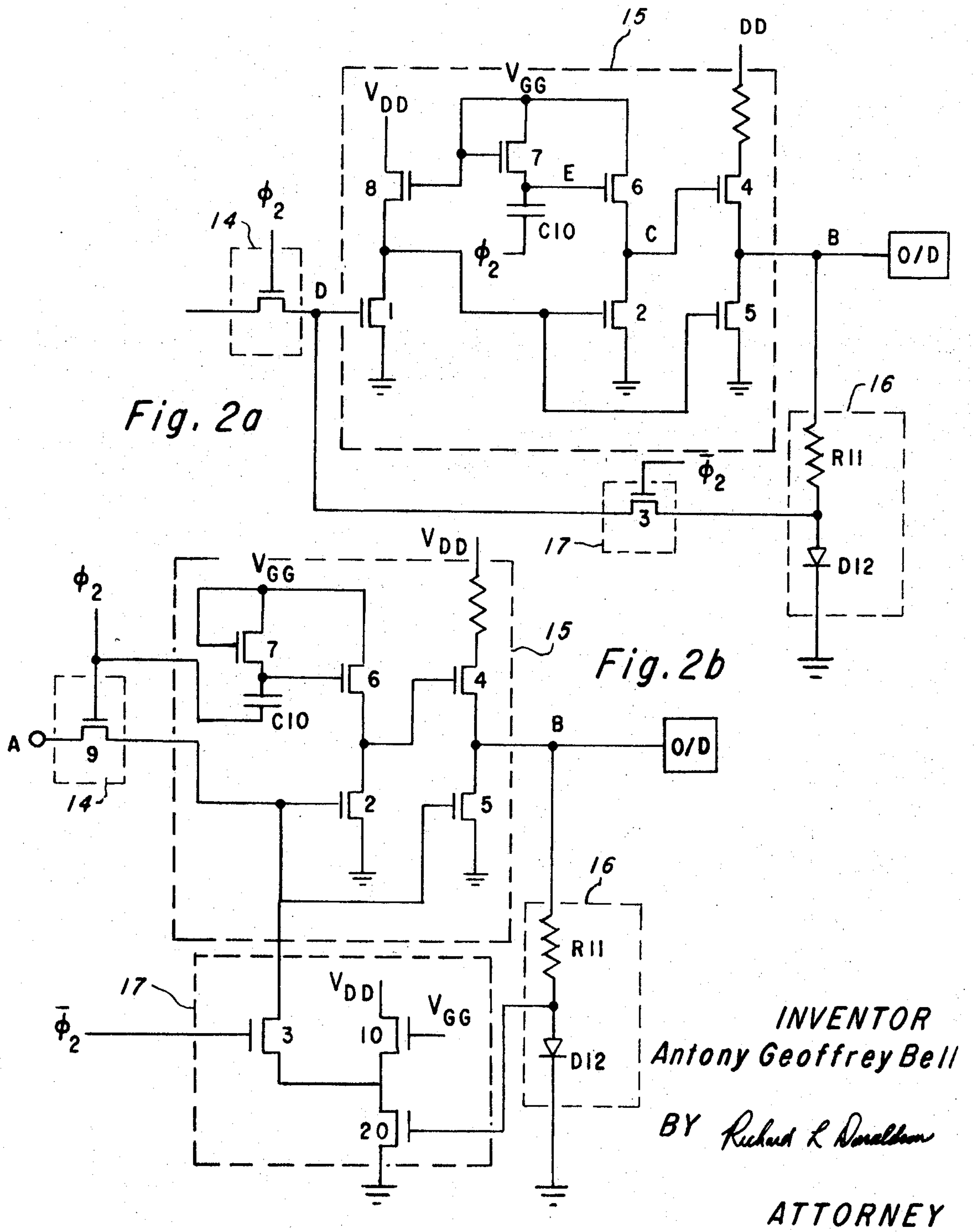

FIGS. 2A and 2B schematically depict two embodiments of the invention wherein 2A shows an embodiment having a non-inverting signal translator, and FIG. 2B shows an embodiment having an inverting signal translator.

With reference now to the drawings and for the present, specifically to FIGS. 1 and 2A, there is depicted a fault protection circuit for the case where the signal translator is non-inverting. The input signal is impressed on the source of the gating transistor 9 which has its gate for receiving a gating signal, referred to in this case as clock 2. The output of transistor 9 is fed into the signal translator 15. Transistor 1 has its gate for receiving this input signal; its drain is coupled to a first voltage source by transistor 8 which acts as a resistor, since a second voltage soruce is connected to its gate. Values for these first and second voltage sources vary according to whether the IGFETS are P or N-channel devices or whether they are operated in the depletion or enhancement mode. Typical values for biasing a specific mode are well known to those skilled in the art. The drain of transistor 1 is connected to the gate of transistor 2, which supplies the drive for output transistor 4, and is connected to the gate of output transistor 5. Output transistor 4 is coupled by resistor 13 to the first voltage source, which creates a logic 1 output, i.e., a high level at terminal B, when transistor 4 turns on. The gate of transistor 4 is coupled by transistor 6 to the second voltage source. The gate of transistor 6 is coupled by transistor 7, connected in a diode configuration to the second voltage souce, and said gate is also coupled by capacitor 10 to clock 2.

The common source-drain electrode of output transistor 4 and 5 is connected to the output terminal and to the feedback circuit. A series resistor and diode combination is connected between the output and substrate ground. Transistor 3, which has its gate to receive the complement of $\phi 2$, couples the gate of transistor 1 with the resistor diode combination R11 and D12.

In FIG. 2A, the input at node A is transferred to node D when clock $\overline{\phi 2}$ goes high. Assuming the input data is low, then the gate of transistor 1 is low turning transistor 1 off, which drives the gates of transistor 2 and output transistor 5 high, turning them on. Point C thus goes low turning off output transistor 4 and the transfer of a logic zero through the signal translator has been achieved. When the input data is a logic 1, the one on the gate of transistor 1 turns it on, driving the gates of transistors 2 and 5 low which turns them off. As transistor 2 turns off, node C rises, allowing the gate of transistor 6 to follow the leading-edge of the voltage waveform $\phi 2$. Node C then rapidly rises in voltage, turning output transistors 4 on rapidly and thus driving the output to a high state of approximately $V_{DD}$ volts.

The state of the output is then fed back when $\phi 2$ goes low (or conversely $\overline{\phi 2}$ goes high) through feedback resistor R11. Thus, as explained earlier, the feedback signal drives the signal translator circuit into the proper state so as to minimize power dissipation, as long as $\phi 2$ is operably connected. A low on the input A results in transistor 4 being turned off and transistor 5 being turned on. Thus, in worst case operation, if the output is shorted high the entire voltage is dropped across the conducting output transistor 5. To minimize power dissipation, transistor 5 must be turned off, which is accomplished by feeding back the logic 1 resulting from the "high" short and allowing it to propagate through the signal translator, thereby turning off transistor 5. Conversely, when output transistor 4 is on and output transistor 5 is off, an output shorted low is the worst case power dissipating state. To achieve minimization for this situation, the logic 0 resulting from the "low" short is fed back and propagates through the signal translator to drive output transistor 4 to a non-conducting state.

Referring now to FIG. 2B, an embodiment is shown wherein the signal translator is an inverter. This is accomplished in this embodiment by the elimination of transistors 1 and 8 in FIG. 2A. The output of gating transistor 9 is then connected directly to the gate of transistor 2. The feedback circuit has an inverter stage comprising the additional series connected transistors 10 and 20 along with the gating transistor 3.

Operation of the circuit of FIG. 2B is similar to the operation of circuit 2a except that the feedback signal is inverted through the inverter stage 10 and 20. This is necessitated by the elimination of the inverter stage transistors 8 and 1 of FIG. 2A. Here again, a proper form of the output signal (this time the complement) is fed back through the signal translator which drives it into the state of minimum power consumption.

It is to be understood that both P channel and N channel IGFETS may be used in the specific embodiments herein described. However, also, it is to be understood that the invention is not limited to IGFETS, but also bi-polar transistors may be utilized.

Although specific embodiments of this invention have been described herein, various modifications to the details of construction will be apparent to those skilled in the art without departing from the scope of the invention.

What is claimed is:

1. In a switching logic circuit providing first and second logic states as an output that includes a signal translator, gating means for selectively coupling a logic input signal to said signal translator in response to a first clock signal, and an output terminal for providing said logic input signal gated through said translator, the improvement comprising:

a. circuit means coupling said output terminal to circuit ground, operative to short circuit voltage spikes to circuit ground; and
b. feedback circuit means responsive to a second clock signal for periodically coupling said output terminal to the input of said signal translator for selectively biasing said signal translator into an opposite logic state corresponding to that logic state at said output terminal.

2. The switching circuit of claim 1 wherein:

a. said signal translator is an electronic inverting amplifier for inverting the logic state of said input signal; and
b. said feedback circuit means provides the complement logic state of the logic state on said output terminal to the input of said signal translator.

3. The switching circuit of claim 1 wherein:

a. said signal translator is an electronic non-inverting amplifier; and
b. said feedback circut means provides a non-inverting signal translator operative to apply a clock the logic state corresponding to the logic state on said output buffer terminal to the input of said signal translator.

4. In a semiconductor logic switching circuit that includes an electronic amplifier circuit of the type utilizing a transistor push-pull output means to provide an output signal having first or second logic states, a gating circuit for selectively coupling an input signal to the input terminal of said electronic amplifier in response to a first gate signal, the improvement comprising:

a. a protection means for resistively coupling said output means to substrate ground; and
b. feedback means responsive to a second clock signal and selectively coupling said amplifier input terminal to said output means when said input signal is decoupled for said input terminal for biasing said amplifier into a logic state corresponding to the logic state on said output means.

5. The semiconductor logic switching circuit of claim 4 wherein said protection means comprises a serially connected resistor and diode between said output and substrate ground.

6. The semiconductor logic switching circuit of claim 4 wherein: supplying a. said feedback means comprises a semiconductor inverting signal translator means for supp lying the complement logic state of the logic state at said output as a selective input to said electronic amplifying circuit; and b. said electronic amplifier circuit is an electronic inverting amplifier for inverting logic states.

7. The semiconductor logic switching circuit of claim 6 wherein said inverting signal translator means comprises:

a. first and second IGFETS connected serially between a first voltage supply and substrate gound, respectively, the first IGFET having a gate connected to a second voltage supply and said second IGFET having a gate connected to the juncture of said serially connected resistor and diode; and b. a third IGFET connected between said gated input and the common source-drain connection of said first and second IGFETS, having a gate for receiving the complement of said gate signal.

8. The semiconductor logic switching circuit of claim 4 wherein:

a. said feedback means comprises a semiconductor non-inverting signal translator means for providing the same logic voltage state as that of said output to the input of said electronic amplifier; and b. said electronic amplifier comprises a non-inverting electronic signal amplifier for transferring said gated input signal.

9. The semiconductor output IGFET buffer circuit of claim 8 wherein said non-inverting signal translator comprises a serially connected IGFET between said gated input and the juncture between said serially connected resistor and diode, having a gate for receiving the complement of said gate signal.

10. An IGFET output buffer circuit comprising:

a. input circuit means for selectively transferring a data input signal responsive to a first clock signal;

b. output circuit means having first and second input terminals for receiving the true and complement logic forms of said selectively transferred data signals, and having an output terminal;

c. a first IGFET having its gate connected to said input circuit means and to said first input terminal of said output circuit means, having its drain connected to said second input terminal of said output circuit means, and having its source connected to substrate ground;

d. a biasing circuit means for resistively coupling a first voltage source to said drain of said first IGFET;

e. a second IGFET having its drain connected to the gate of said first IGFET, and having a gate for receiving the complement of said first clock signal;

f. a third IGFET having its drain connected to the source of said second IGFET, having its source connected to circuit ground, and having a gate coupled to said output terminal;

g. a resistor means coupling said source of said third IGFET to a second voltage source; and h. a protection circuit means connected to said output terminal for resistively coupling said terminal to substrate ground.

11. The output buffer of claim 10 wherein said output circuit means comprises fourth and fifth IGFETS connected in series, wherein said output terminal is connected to the common electrodes of said fourth and fifth IGFETS, said second input terminal is connected to the gate of said fourth IGFET, said first input terminal is connected to the gate of said fifth IFGET, said fourth and fifth IGFETS coupling said second voltage source to substrate ground.

12. The output buffer of claim 10 wherein said input circuit means comprises an IGFET having a gate for receiving said first clock signal, having its source for receiving said data input signal, and having its drain connected to said gate of said first IGFET.

13. The output buffer of claim 12 wherein said protection circuit means comprises a series resistor and diode, between said output terminal and substrate ground, respectively, and the common junction of resistor and diode connected to the gate of said third IGFET.

14. The output buffer of claim 13 wherein said bias circuit means comprises:

a. a sixth IGFET having its source connected to the said drain of said second IGFET, and having its drain connected to the said first voltage source;

b. a seventh IGFET having its drain connected to said first voltage source, having its gate connected to said first voltage source and having its source connected to the gate of said sixth IGFET and also coupled to said first clock signal by a capacitor.

15. The output buffer circuit of claim 14 wherein said resistor means comprises an IGFET having its gate connected to said first voltage supply, having its drain connected to said second voltage supply, and having its source connected to the drain of said third IGFET.

16. An IGFET output buffer comprising:

a. an input circuit for selectively transferring a data input signal in response to a first clock signal;

b. output circuit means having first and second input terminals for receiving the true and complement logic forms of said selectively transferred input signal, and having an output terminal;

c. a first IGFET having its gate connected to said input circuit means and having its source connected to circuit ground;

d. a bias circuit means for resistively coupling a first voltage supply to the drain of said first IGFET;

e. a second IGFET having its source connected to substrate ground, having its gate connected to the said drain of said first IGFET and to the said first terminal of the said output circuit means, and having its drain connected to the said second input terminal of said output circuit means;

f. a second bias means coupling a said second voltage source to the said drain of said second IGFET:

g. a protection circuit means connected to said output terminal for resistively coupling said terminal to substrate ground; and h. a third IGFET having its drain connected to the said gate of said first IGFET, having its source coupled to said output terminal, and having its gate for receiving the complement of said first clock signal.

17. The output buffer circuit of claim 16 wherein said output circuit means comprises fourth and fifth IGFETS connected in series coupling said first voltage source to substrate ground, wherein the said output terminal is connected to the common electrode of said fourth and fifth IGFET, the said second input terminal is connected to the gate of said fourth IGFET, and the said first input terminal is connected to the gate of said fifth IGFET.

18. The output buffer of claim 17 wherein said input circuit means comprises an IGFET having a gate for receiving said first clock signal, having its source for receiving said data input signal, and having its drain connected to the gate of said first IGFET.

19. The output buffer of claim 18 wherein said protection circuit means comprises a serially connected resistor and diode between said output and substrate ground, respectively, and the common junction of said resistor and said diode connected to the source of said third IGFET.

20. The output buffer of claim 19 wherein said first bias circuit means omprises a fifth IGFET having its drain connected to said first voltage source, having its source connected to the drain of said first IGFET and having its gate connected to said second voltage source.

21. The output buffer of claim 20 wherein said second bias circuit means comprises:

a. a sixth IGFET having its drain connected to said second voltage source, and having its source connected to the said drain of said second IGFET; and b. a seventh IGFET having its drain connected to said second voltage source, having its gate connected to said second voltage source, and having its source connected to the gate of said sixth IGFET, said source also coupled to said first clock signal by a capacitor.

22. The output buffer of claim 20 wherein the drain of said fourth IGFET is coupled to said first voltage source by a resistor.

23. The output buffer of claim 15 wherein the drain of said fourth IGFET is coupled to said first voltage source by a resistor.

24. In a logic switching circuit that provides as an output signal the true or complement logic state of a received logic input signal, said circuit including a signal translator, gating means for periodically coupling a logic input signal to said signal translator, and an output terminal for providing said input signal transferred through said translator, the improvement comprising:

feedback circuit means for selectively biasing said signal translator into another logic state when said input signal is decoupled from said translator, said another logic state corresponding to the logic state impressed at said output terminal.

25. The logic switching circuit of claim 24 wherein said feedback circuit means provides the complement logic state of that logic state on said output terminal to the input terminal of said signal translator.

26. The logic switching circuit of claim 24 wherein said feedback means provides the logic state of that logic state on said output terminal to the input of said signal translator.

* * * * *